Dec. 20, 1955   E. CRUCIANI   2,727,282
CENTERING HAVING A LIGHTENED CROSS-SECTION
Filed April 21, 1952
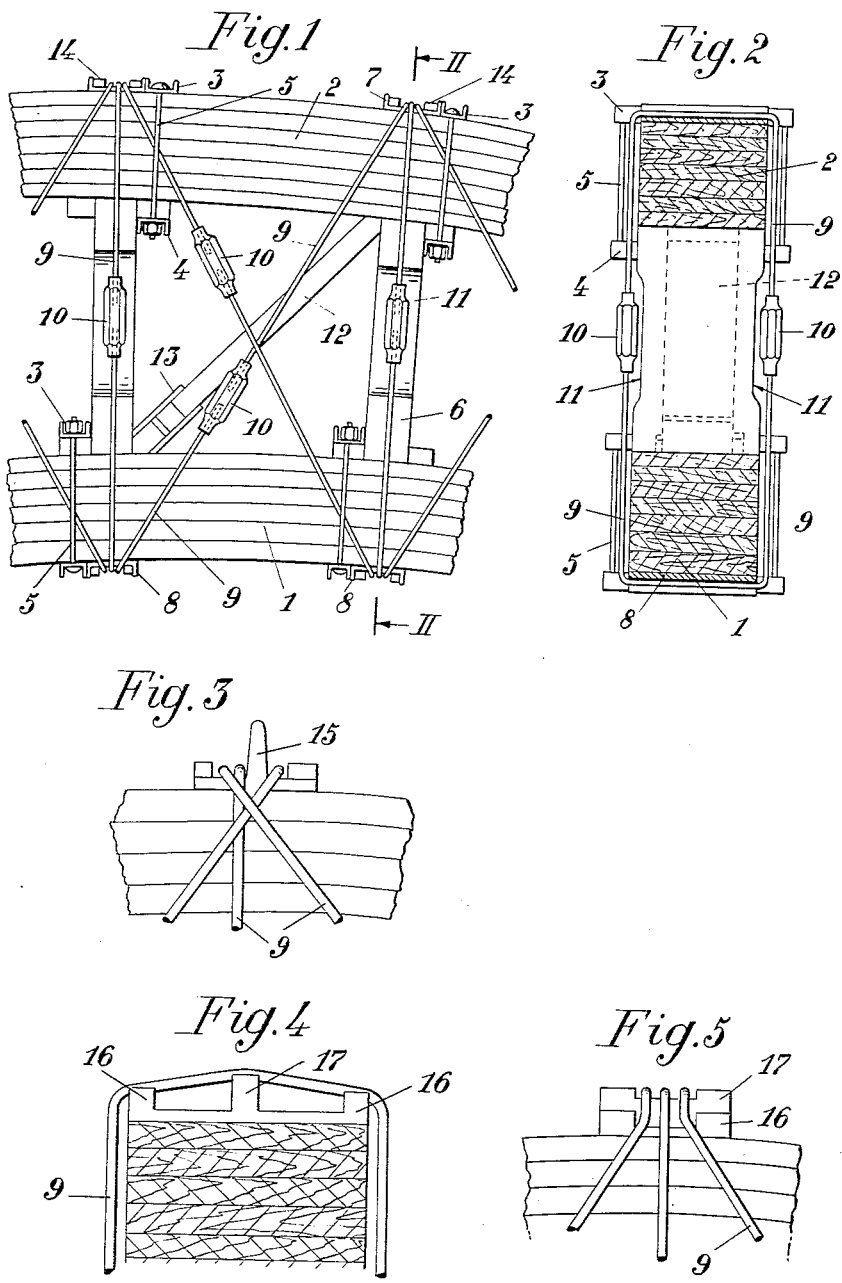

United States Patent Office 2,727,282
Patented Dec. 20, 1955

2,727,282

CENTERING HAVING A LIGHTENED CROSS-SECTION

Eusebio Cruciani, Rome, Italy

Application April 21, 1952, Serial No. 283,345

4 Claims. (Cl. 20—.5)

The present invention relates to some improvements to a centering having a lightened cross-section, for masonries in general, arch or dome shaped, of whatever form, which may be used also as support for flat or curved structures, and which is suitable to form a supporting structure for slating, foot-bridges and the like.

Said centering is the subject matter of an earlier copending U. S. application, filed October 25, 1951, Serial No. 253,174, of the same applicant. This is a continuation in part of said application.

In the aforecited application is described a centering composed by one or more arches, each whereof is formed by one or more layers of boards or sheets, superposed and curved, said layers being distanced between themselves by distancing elements, and the complex being held together by means of compressing elements.

In the form of embodiment described in the aforecited patent application, the compressing members are formed by a plurality of transverse elements, substantially iron channels, wherein are engaged bolts provided at one end with a head resting within one of said channels, and at the other end with a thread whereon a nut is fit for submitting the bolt to tension, said nut resting in another iron channel placed on the opposite surface of the structure.

Said bolts or tie-rods are placed on the sides of the boards or sheets, and generally on the sides of the members forming the layers, and therefore they exert their function in the aforecited iron channels, without requiring particular applications in the material of the boards or sheets, applications which would damage the material, which could hardly be re-employed.

However, in said form of embodiment of this invention, there are some difficulties in submitting the tie-rods to tension, as the nuts are contained inside the iron channels, and therefore they are hardly reached and operated by means of a wrench, particularly if they have to be submitted to a tensile stress when the centering is already in its place, before the casting of the masonry.

According to the present improvement, said difficulties are overcome by substituting for the aforecited tie-rods, made by long bolts provided with thread and nut, staple shaped irons, i. e. U bent bars, f. i. round bars, possibly provided at their extremities with reverse hand threads, so as to allow the connection, by means of tensioning elements, of two of said U-shaped irons facing each other and engaging, by means of their central parts, two channels, one whereof being placed above the upper layer of the centering and the other being placed under the lower layer. It is then possible to subject the so embodied tie-rods to tensile stress without difficulty, as the terminal elements of the U-shaped bars are facing, for instance, said terminal elements, if threaded, can be connected by means of a sleeve nut or a turnbuckle having two reverse hand female screws. The turnbuckles are placed on the sides of the centering, substituting thus the nuts inserted in the channels.

The improvement facilitates the construction, because it is no longer necessary to make the holes in the iron channels for the passage of the tie-rods, as the central part of the U-shaped bars is simply bearing inside the channels. Material is also spared, as the channels have a length corresponding to the width of the centering. Lastly the improvement facilitates the mounting of the centering in its working place, said mounting being effected by putting in its place first the lower layer of the structure, constructed away from its place, even if in portions; in this case a constructive element lighter than the entire centering has to be put in operation, said element being formed by the aforecited lower layer whereon are then mounted the distancing elements and on these latter the upper layer of the centering. This latter layer also may be constructed, in portions, away from its place, and then mounted, or it may be totally constructed in its working place.

According to the present improvement in the space which is limited by the upper layer, by the lower layer and by two distancing elements, may be added internal diagonal elements having an adjustable length, said elements being provided with compressing or tensioning elements. Said diagonal elements may be used as structural auxiliary means if necessary, as they can also be axially compressed. Furthermore said diagonal elements may also totally substitute the external tie-rods, for instance if it is necessary to reduce to the minimum possible the lateral dimensions of the centering.

Said diagonal elements may be placed isolated or in crossed pairs in the aforeindicated space and mounted also by means of bolts or hinges or rivets or similar means. They can also be connected to the tie-rods or to the external channels or connected to the distancing elements and between themselves.

Some preferred forms of embodiment of the present improvement are shown, by way of example, in the attached drawing, wherein:

Fig. 1 is a side elevational fragmentary view of a portion of a centering;

Fig. 2 is a sectional view at line II—II in Fig. 1;

Fig. 3 is a fragmentary side elevation of a different form of embodiment of the fixing means for the U-shaped bars;

Fig. 4 is a lengthwise fragmentary view of a different form of embodiment of the fixing means for the U-shaped bars;

Fig. 5 is a side elevational view of Fig. 4.

With reference to the drawing, in Figs. 1 and 2, 1 is the lower layer of boards or sheets forming the centering, and 2 is the upper layer.

The boards or sheets forming each layer are connected between themselves by compressing means formed in their turn by iron channels 3 and 4 connected by bolts 5 provided with a threaded end. On said threaded end is screwed a nut so as to adjust the tensile stress of said bolts.

The two layers 1 and 2 are distanced by the distancing elements 6 and the complex is held by the compressing elements comprising a series of iron channels 7 placed outside the upper layer 2, a series of iron channels 8 placed outside the lower layer 1 and tie-rods 9 connecting said iron channels.

Said tie-rods 9 are placed parallel to the distancing elements 6 as well as diagonal in respect of said distancing elements and crossed between iron channels placed on the two layers.

Each tie-rod 9 is formed by two U-shaped bars which have their central portion inserted in one of the channels, while the parallel branches are placed on the sides of the structure, their extremities being connected by means of turnbuckles 10 provided with reverse hand threads.

In order to fix the position within the iron channels 7 and 8 of the tie-rods 9, small blocks of iron or other resistant material 14 can be used, said blocks holding the U-shaped bars 9, placed in each iron channel, close together.

In order to facilitate the operation of the turnbuckles 10 connecting the bars 9 placed parallel to the distancing elements 6, said distancing elements may be provided with a central shrinking portion which facilitates the application of the tool or wrench for rotating the turnbuckles.

Internally to the structure may be placed the diagonal elements 12, single or double, and in this latter case, in crossed position. Said elements can be made so as to be submitted to tensile stress or to compression.

In the figure is shown, for better understanding, only one of said elements, and is shown only diagrammatically in 13, a device for submitting the diagonal element to tensile stress or to compression. This device 13 is of a per se known type and may vary according to the type of stress to which the element 12 is submitted.

As aforesaid, the elements 12 may be fixed or not to the constructive elements of the centering, and they can be connected to the tie-rods or to the external iron channels or to the distancing elements. They can also substitute totally the lateral tie-rods.

In a different form of embodiment the iron channels (Fig. 3) may be substituted by T irons 15. On said T irons 15 the U-shaped bars 9 are placed on the two sides of the central stem so as to have a tensile component on said central stem, if the bars have a diagonal direction.

In a further form of embodiment, the iron channel is substituted by elements placed lengthwise in respect of the centering.

This variation of embodiment is shown in Figs. 4 and 5 wherein by 16 are shown the two lateral elements and by 17 is shown the central element.

Each of said elements, both the lateral and the central, is formed by a block provided in its central portion with a groove wherein are placed the U-shaped bars 9. Preferably the central block 17 is higher than the lateral ones 16, in order to improve the compressing action of the bars on the boards forming the layer.

I claim:

1. A centering having a lightened cross-section for an arch, comprising in combination an upper chord and a lower chord said chords being curved in the same direction, distancing members between the two chords, said members being directed along the radii of said chords and being uniformly spaced apart from each other, each chord being formed with a plurality of superposed boards pressed together by means of elongated bolts disposed alongside of the chord, connecting members between the two chords in the shape of U-bolts having spaced legs, said connecting members being disposed in pairs, one of the bolts in each pair being applied to one chord and having its legs directed upwardly and the other bolt applied to the other chord being directed downwardly, a bolt in one pair facing the other bolt substantially at half height of the centering and means for connecting the two bolts in each pair.

2. A centering having a lightened cross-section for an arch comprising in combination an upper chord and a lower chord said chords being curved in the same direction, distancing members between the two chords, said members being directed along the radii of said chords and being uniformly spaced apart from each other in the longitudinal direction of the centering, each chord being formed with a plurality of superposed boards pressed together by means of elongated bolts disposed alongside of the chord, tension members disposed for connecting the two chords at the said distancing members, said tension members being in the shape of U-bolts having spaced legs, said last named bolts being disposed in pairs, one of the bolts in each pair being applied to one chord and having its legs directed upwardly and the other bolt applied to the other chord being directed downwardly, a bolt in one pair facing the other bolt substantially at half height of the centering, metallic channels having a length equal to the width of the boards disposed on the upper surface of the upper chord and on the lower surface of the lower chord perpendicular to the longitudinal direction of the chord, said channels being interposed between the chords and the said last named bolts to hold the latter and means drawing towards each other the ends of said last named bolts to press together said chords and said distancing members.

3. A centering having a lightened cross-section for an arch, comprising in combination an upper chord and a lower chord said chords being curved in the same direction, distancing members between the two chords, said members being directed along the radii of said chords and being uniformly spaced apart from each other in the longitudinal direction of the centering, each chord being formed with a plurality of superposed boards pressed together by means of elongated bolts disposed alongside of the chord, tension members disposed at the same distancing members connecting the two chords, said tension members being in the shape of U-bolts having spaced legs, said last named bolts being disposed in pairs, one of the bolts in each pair being applied to one chord and having its legs directed upwardly and the other bolt applied to the other chord being directed downwardly, the bolt in one pair facing the other bolt substantially at half height of the centering, metallic channels disposed on the upper surface of the upper chord and on the lower surface of the lower chord, said channels having a length equal to the width of the boards and being disposed perpendicular to the longitudinal direction of the chord and interposed between the chord and the said last named bolts to hold the latter, said last named bolts having threaded ends, turnbuckles mounted on said threaded ends in each pair and tensioning said last named bolts by drawing together said last named bolts.

4. A centering having a lightened cross-section for an arch, comprising in combination an upper chord and a lower chord said chords being curved in the same direction, distancing members between said two chords, said members being directed along the radii of said chords and being uniformly spaced from each other in the longitudinal direction of the centering, a strut diagonally disposed between two distancing members and abutting at its ends the upper chord, the lower chord and the said distancing members, each chord being formed with a plurality of superposed boards pressed together by means of elongated bolts disposed alongside of the chord, radial tension members at the distancing members connecting said chords, said tension members being in the form of U-bolts having spaced legs, said bolts being disposed in pairs, one of the bolts in each pair applied to one chord being directed upwardly and the other bolt applied to the other chord being directed downwardly, the bolt in one pair facing the other bolt in said pair substantially at half height of the centering, means connecting said bolts together metallic channels disposed on the upper surface of the upper chord and on the lower surface of the lower chord, said channels having a length equal to the width of the boards and being disposed perpendicular to the longitudinal direction of the chord and interposed between the chord and the said bolts to hold the latter, a series of downwardly inclined U-bolts having legs straddling the upper chord, a series of upwardly inclined U-bolts having legs straddling the lower chord, the bolts of both of said series being received in said channels, the downwardly inclined U-bolts and the upwardly inclined U-bolts being arranged in pairs with the legs of each pair being aligned, means connecting together the legs of each pair, pairs of said inclined bolts being disposed crosswise with respect to other pairs, the last mentioned connecting means being disposed in displaced relation to the cross point of legs connected thereby.

References Cited in the file of this patent

UNITED STATES PATENTS

| | | |
|---|---|---|
| 96,569 | Ensign | Nov. 9, 1869 |
| 389,951 | Buchanan | Sept. 25, 1888 |
| 1,330,771 | Tregillus | Feb. 10, 1920 |
| 2,251,578 | Rietzke | Aug. 5, 1941 |

FOREIGN PATENTS

| | | |
|---|---|---|
| 20,677 | Austria | of 1905 |
| 76,370 | Austria | of 1919 |